United States Patent
Mansaray

(10) Patent No.: US 11,973,832 B2
(45) Date of Patent: Apr. 30, 2024

(54) RESOLVING POLARITY OF HOSTED DATA STREAMS

(71) Applicant: Truist Bank, Charlotte, NC (US)

(72) Inventor: Tariq Sulaiman Mansaray, Raleigh, NC (US)

(73) Assignee: TRUIST BANK, Charlotte, NC (US)

(*) Notice: Subject to any disclaimer, the term of this patent is extended or adjusted under 35 U.S.C. 154(b) by 12 days.

(21) Appl. No.: 17/807,470

(22) Filed: Jun. 17, 2022

(65) Prior Publication Data

US 2023/0412686 A1    Dec. 21, 2023

(51) Int. Cl.
*H04L 67/133* (2022.01)
*G06N 3/044* (2023.01)
*G06N 3/045* (2023.01)
*G06N 3/063* (2023.01)

(52) U.S. Cl.
CPC ........... *H04L 67/133* (2022.05); *G06N 3/044* (2023.01); *G06N 3/045* (2023.01); *G06N 3/063* (2013.01)

(58) Field of Classification Search
CPC ...... H04L 67/133; G06N 3/045; G06N 3/044; G06N 3/063
USPC .......................................................... 709/226
See application file for complete search history.

(56) References Cited

U.S. PATENT DOCUMENTS

| | | | |
|---|---|---|---|
| 2015/0112981 A1* | 4/2015 | Conti | G06F 16/9538 707/730 |
| 2018/0322114 A1* | 11/2018 | Kuo | G06Q 10/067 |
| 2019/0385085 A1* | 12/2019 | Papadopoullos | G06N 5/022 |
| 2020/0219495 A1* | 7/2020 | Alkan | G10L 15/22 |
| 2020/0356625 A1* | 11/2020 | Tater | G06F 40/226 |
| 2021/0256541 A1* | 8/2021 | L'Huillier | G06Q 30/0201 |
| 2023/0016729 A1* | 1/2023 | Pouran Ben Veyseh | G06F 40/30 |
| 2023/0214888 A1* | 7/2023 | Renard | G06Q 30/016 705/7.29 |

* cited by examiner

*Primary Examiner* — Nicholas R Taylor
*Assistant Examiner* — Chong G Kim
(74) *Attorney, Agent, or Firm* — Michael A. Springs, Esq.; Shumaker, Loop & Kendrick, LLP; Patrick B. Horne

(57) ABSTRACT

Disclosed are systems and methods that that automatically classify, filter, and reduce large volumes of hosted content data using artificial intelligence technology. The aggregated hosted content data is reduced by representing the hosted content data as sets of data polarity identifiers or data polarity values that correspond to one or more sequencing identifiers that are displayed on a graphical user interface. Hosted content data packets are segmented by labeling the hosted content data packets with a sequencing identifier. The hosted content data packets are processed utilizing neural network technology to classify the hosted content data according to a polarity identifier, polarity value, sentiment identifier, or one or more subject identifiers.

20 Claims, 7 Drawing Sheets

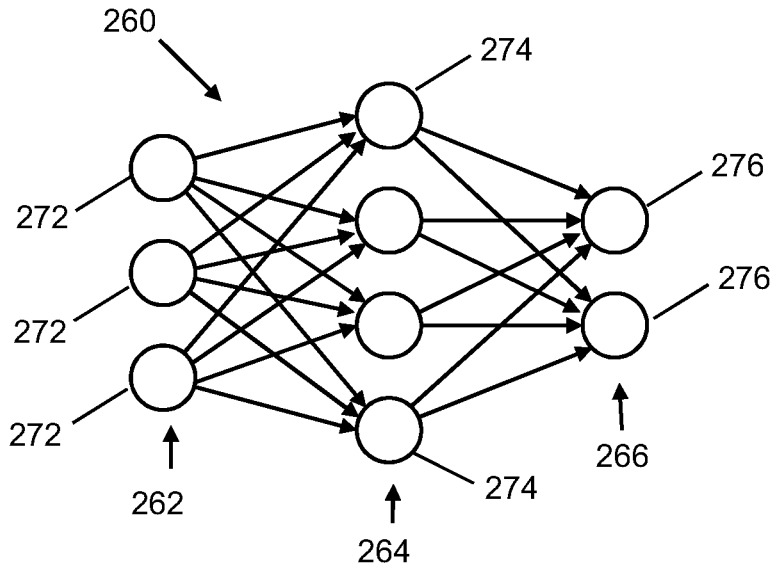
FIG. 2A
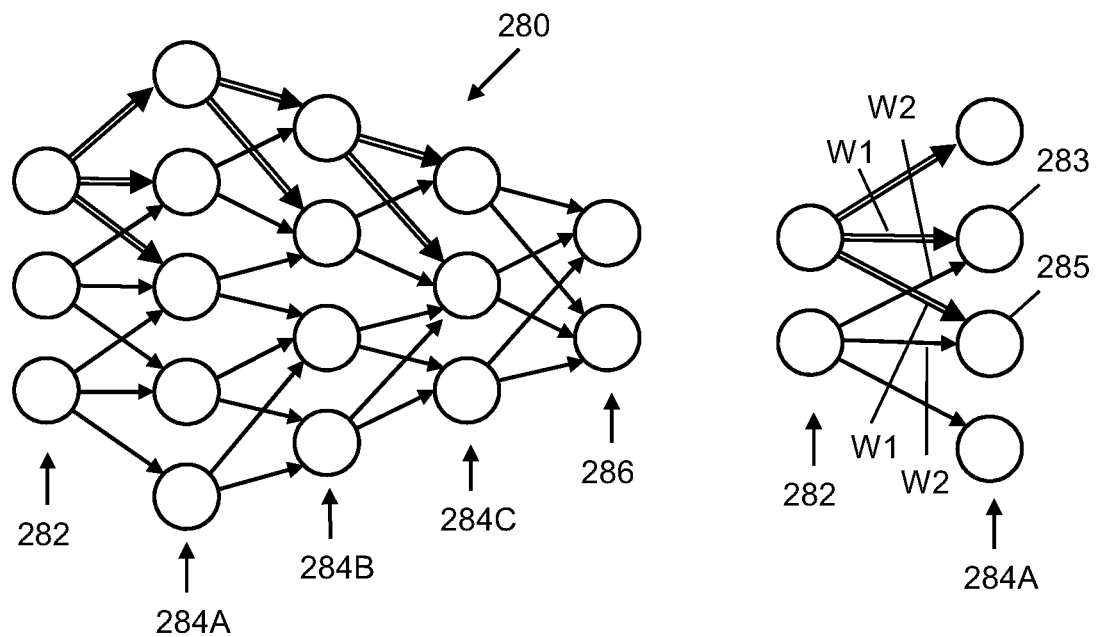
FIG. 2B
FIG. 2C

RESOLVING POLARITY OF HOSTED DATA STREAMS

TECHNICAL FIELD AND BACKGROUND

The present invention relates generally to the field of processing user content data, such as user messages, and more particularly, to systems and methods for filtering, classifying, and determining the polarity of user content data streams hosted on third party technology platforms.

User content data, such as user messages, is typically received directly by an enterprise through channels such as emails sent to an enterprise domain, messaging data uploaded to an enterprise website, or user content data transmitted through an enterprise mobile software application. The user content data can be analyzed to determine, among other attributes, the polarity of the content data as being positive or negative or classification of the data as relating to a particular system, service, or other subject. The user content data attributes can in turn allow enterprises to identify system or service problems and design and implement system or service enhancements.

One drawback of conventional methods for capturing user content data is that the data is generally limited with respect to the information conveyed because the content data is generated in response to a closed-ended data request from an enterprise. It is increasingly more common, however, that user content data streams are submitted to, and hosted by, third party technology platforms that are not maintained by the enterprise to which the content data relates. User content data streams submitted to third party platforms are more open ended and convey a greater variety of information. It would be advantageous to capture hosted user content data streams for analysis.

Considering the foregoing, it is an object of the present invention to provide systems and methods that automate the capture of user content data streams hosted by a third party technology platform and that analyze the user content data using artificial intelligence and natural language processing ("NPL") technology. The automated processing filters, classifies, determines the polarity of, and reduces aggregated user content data to make the data more accessible for analysis in identifying system and service problems or implementing enhancements.

SUMMARY

According to one embodiment, a system for resolving the attributes of hosted content data includes a first computing device configured with one or more integrated software applications that perform operations that include implementing a Remote Host application programming interface (API) that interfaces with a remote hosting provider technology platform. The Remote Host API transmits a remote content data request to the remote hosting provider technology platform where the remote content data request includes an enterprise identifier and a requested content range. The requested content range can be, for example, a time period over which to retrieve user content data or a volume of content data to be retrieved by the remote hosting provider technology platform.

In response to the content data request, the Remote Host API receives one or more hosted content data packets that each include user content data, such as user-generated messaging data, and sequencing data that falls within the requested content range. The sequencing data can be, for instance, time and date information that seeks content data within a time period specified in the requested content range. The system includes a reduction software service that receives the one or more hosted content data packets as well as enterprise content parameter data having one or more sequencing identifiers that each represent a sequence range, such as time period labels that represent a time period.

The reduction software service executes the operations of first determining whether each of the one or more hosted content data packets falls within a sequencing range by processing the sequencing identifiers and the sequencing data for each of the hosted content data packets. The reduction software service also labels the one or more hosted content data packets with at least one of the sequencing identifiers when the hosted content data packet falls within at least one of the sequencing ranges. In this manner, the hosted content data packets are each associated with a sequence identifier, such as a time period identifier (e.g., a particular day, month, or week). The reduction software service also performs a polarity analysis that processes the user content data for each hosted content data packet labeled with at least one of the sequencing identifiers, and outputs a polarity identifier for each of the one or more sequencing identifiers.

In one embodiment, the polarity analysis also generates a polarity score for each of the one or more sequencing identifiers, and the sequencing identifiers each correspond to a time period. The polarity identifiers, polarity scores, and the sequencing identifiers are transmitted to an end user computing device for display on a polarity explorer graphical user interface (GUI). The polarity explorer graphical user interface displays each sequencing identifier with an associated polarity identifier and a polarity score. For instance, each time period, such as a given date, is displayed with a positive or negative polarity indicator and a polarity score indicating the degree of positivity or negativity.

The reduction software service can be implemented with least one neural network that is used to perform the polarity analysis. The neural network can be a convolutional neural network having at least three intermediate layers. In another embodiment, the neural network is a recurrent neural network having at least three intermediate layers. In yet another embodiment, the at least one recurrent neural network is implemented with a long short-term memory neural network architecture.

To provide additional data attributes, the first computing device can be configured to perform further operations that include executing a subject analysis that processes the user content data for each hosted content data packet labeled with at least one of the sequencing identifiers, and generates at least one subject identifier for each of the one or more sequencing identifiers. The reduction software service can be implemented with a neural network that is utilized to execute the subject classification analysis. The reduction software service can also be implemented with a second neural network that is utilized to execute the polarity analysis.

In a further embodiment, the first computing performs operations that include executing a sentiment analysis. The sentiment analysis processes the user content data for each hosted content data packet labeled with at least one of the sequencing identifiers, and generates at least one sentiment identifier for each of the one or more sequencing identifiers.

BRIEF DESCRIPTION OF THE DRAWINGS

Features, aspects, and advantages of the present invention are better understood when the following detailed description of the invention is read with reference to the accompanying figures, in which:

FIG. 2A is a diagram of a feedforward network, according to at least one embodiment, utilized in machine learning.

FIG. 2B is a diagram of a convolution neural network, according to at least one embodiment, utilized in machine learning.

FIG. 2C is a diagram of a portion of the convolution neural network of FIG. 2B, according to at least one embodiment, illustrating assigned weights at connections or neurons.

DETAILED DESCRIPTION

Figure 1:
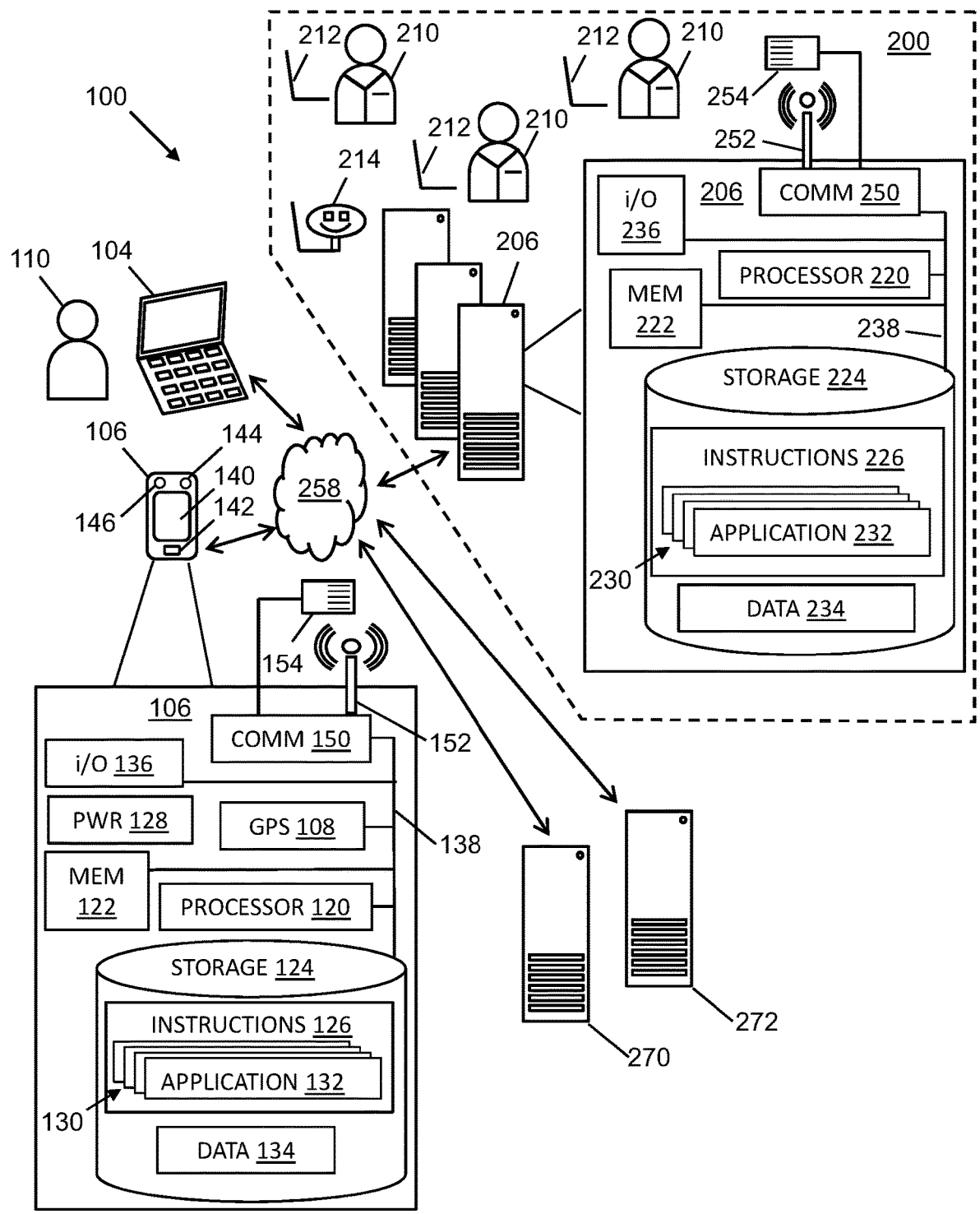
FIG. 1 is an example system diagram according to one embodiment.

The present invention will now be described more fully hereinafter with reference to the accompanying drawings in which example embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole (as would be appreciated by one of ordinary skill in the art).

The terms "coupled," "fixed," "attached to," "communicatively coupled to," "operatively coupled to," and the like refer to both: (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

As used herein, the terms "enterprise" or "provider" generally describes a person or business enterprise that hosts, maintains, or uses the disclosed systems and methods. The term "users" is at times used interchangeably with the term "messaging data sources" or "hosted content data sources" and refers to humans that generate expressions and content included in the messaging data that can be processed using artificial intelligence and natural language processing technologies. The term "content data" or "hosted content data" includes alphanumeric text data, images, and audio-visual data uploaded by end users to a remote hosting provider and captured by an enterprise for analysis. The content data can include messages generated by end users and associated with the enterprise, messages directed to the enterprise, or messages responding to a post, publication, transmission, or broadcast of data by an enterprise through a remote hosting provider technology platform.

Embodiments are described with reference to flowchart illustrations or block diagrams of methods or apparatuses where each block or combinations of blocks can be implemented by computer-readable instructions (i.e., software). The term apparatus includes systems and computer program products. The referenced computer-readable software instructions may be provided to a processor of a general purpose computer, special purpose computer, or other programmable data processing apparatus to produce a particular machine. The instructions, which execute via the processor of the computer or other programmable data processing apparatus, create mechanisms for implementing the functions specified in this specification and attached figures.

The computer-readable instructions are loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the attached flowchart(s) or block diagram(s). Alternatively, computer software implemented steps or acts may be combined with operator or human implemented steps or acts in order to carry out an embodiment of the disclosed systems and methods.

The computer-readable software instructions may also be stored in a computer-readable memory that can direct a computer or other programmable data processing apparatus to function in a particular manner. In this manner, the instructions stored in the computer-readable memory produce an article of manufacture that includes the instructions, which implement the functions described and illustrated herein.

Disclosed are systems and methods that interface with a remote hosting provider technology platform to capture hosted content data that includes user messaging data, display data, and hosted content metadata. The resulting hosted content data is aggregated, filtered, classified, and analyzed to determine polarity or sentiment and data subjects using artificial intelligence and natural language processing technology. The various data attributes are formatted for output and display on an end user computing device.

System Level Description

As shown in FIG. 1, a hardware system 100 configuration according to one embodiment generally includes a user 110 that benefits through use of services and products offered by a provider through an enterprise system 200. The user 110 accesses services and products by use of one or more user computing devices 104 & 106. The user computing device can be a larger device, such as a laptop or desktop computer 104, or a mobile computing device 106, such as smart phone or tablet device with processing and communication capabilities. The user computing device 104 & 106 includes integrated software applications that manage device resources, generate user interfaces, accept user inputs, and facilitate communications with other devices, among other functions. The integrated software applications can include an operating system, such as Linux®, UNIX®, Windows®, macOS®, iOS®, Android®, or other operating system compatible with personal computing devices.

The user 110 can be an individual, a group, or an entity having access to the user computing device 104 & 106. Although the user 110 is singly represented in some figures, at least in some embodiments, the user 110 is one of many, such as a market or community of users, consumers, customers, business entities, government entities, and groups of any size.

The user computing device includes subsystems and components, such as a processor 120, a memory device 122, a storage device 124, or power system 128. The memory device 122 can be transitory random access memory ("RAM") or read-only memory ("ROM"). The storage device 124 includes at least one of a non-transitory storage medium for long-term, intermediate-term, and short-term storage of computer-readable instructions 126 for execution by the processor 120. For example, the instructions 126 can include instructions for an operating system and various integrated applications or programs 130 & 132. The storage device 124 can store various other data items 134, including, without limitation, cached data, user files, pictures, audio and/or video recordings, files downloaded or received from other devices, and other data items preferred by the user, or related to any or all of the applications or programs.

The memory device 122 and storage device 124 are operatively coupled to the processor 120 and are configures to store a plurality of integrated software applications that comprise computer-executable instructions and code executed by the processing device 120 to implement the functions of the user computing device 104 & 106 described herein. Example applications include a conventional Internet browser software application and a mobile software application created by the provider to facilitate interaction with the enterprise system 200.

The integrated software applications also typically provide a graphical user interface ("GUI") on the user computing device display screen 140 that allows the user 110 to utilize and interact with the user computing device. Example GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

The processing device 120 performs calculations, processes instructions for execution, and manipulates information. The processing device 120 executes machine-readable instructions stored in the storage device 124 and/or memory device 122 to perform methods and functions as described or implied herein. The processing device 120 can be implemented as a central processing unit ("CPU"), a microprocessor, a graphics processing unit ("GPU"), a microcontroller, an application-specific integrated circuit ("ASIC"), a programmable logic device ("PLD"), a digital signal processor ("DSP"), a field programmable gate array ("FPGA"), a state machine, a controller, gated or transistor logic, discrete physical hardware components, and combinations thereof. In some embodiments, particular portions or steps of methods and functions described herein are performed in whole or in part by way of the processing device 120. In other embodiments, the methods and functions described herein include cloud-based computing such that the processing device 120 facilitates local operations, such communication functions, data transfer, and user inputs and outputs.

The user computing device 104 & 106 incorporates an input and output system 136 operatively coupled to the processor device 120. Output devices include a display 140, which can be, without limitation, a touch screen of the mobile device 106 that serves both as an output device. The touch-screen display provides graphical and text outputs for viewing by one or more users 110 while also functioning as an input device, by providing virtual buttons, selectable options, a virtual keyboard, and other functions that, when touched, control the user computing device. The user output devices can further include an audio device, like a speaker 144.

The user computing device 104 & 106 may also include a positioning device 108, such as a global positioning system device ("GPS") that determines a location of the user computing device. In other embodiments, the positioning device 108 includes a proximity sensor or transmitter, such as an RFID tag, that can sense or be sensed by devices proximal to the user computing device 104 &106.

A system intraconnect 138, such as a bus system, connects various components of the mobile device 106. The user computing device 104 & 106 further includes a communication interface 150. The communication interface 150 facilitates transactions with other devices and systems to provide two-way communications and data exchanges through a wireless communication device 152 or wired connection 154. Communications may be conducted via various modes or protocols, such as through a cellular network, wireless communication protocols using IEEE 802.11 standards. Communications can also include short-range protocols, such as Bluetooth or Near-field communication protocols. Communications may also or alternatively be conducted via the connector 154 for wired connections such by USB, Ethernet, and other physically connected modes of data transfer.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210 act on behalf of the enterprise, such as customer service representatives, advisors, managers, and sales team members.

Human agents 210 utilize agent computing devices 212 to interface with the enterprise system 200. The agent computing devices 212 can be, as non-limiting examples, computing devices, kiosks, terminals, smart devices such as phones, and devices and tools at customer service counters and windows at POS locations. In at least one example, the diagrammatic representation and above-description of the components of the user computing device 104 & 106 in FIG. 1 applies as well to the agent computing devices 212. As used herein, the general term "end user computing device" can be used to refer to either the agent computing device 212 or the user computing device 110 depending on whether the agent (as an employee or affiliate of the enterprise) or the user (as a customer or consumer) is utilizing the disclosed systems and methods to segment, parse, filter, analyze, and display hosted content data.

Human agents 210 interact with users 110 or other agents 212 by phone, via an instant messaging software application, or by email. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components, such as a processor device 220, an input-output system 236, an intraconnect bus system 238, a communication interface 250, a wireless device 252, a hardwire connection device 254, a transitory memory device 222, and a non-transitory storage device 224 for long-term, intermediate-term, and short-term storage of computer-readable instructions 226 for execution by the processor device 220. The instructions 226 can include instructions for an operating system and various software applications or programs 230 & 232. The storage device 224 can store various other data 234, such as cached data, files for user accounts, user profiles, account balances, and transaction histories, files downloaded or received from other devices, and other data items required or related to the applications or programs 230 & 232.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations.

The network 258 may be or include an enterprise or secured network, or may be implemented, at least in part, through one or more connections to the Internet. A portion of the network 258 may be a virtual private network ("VPN") or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100.

External systems 270 & 272 represent a remote hosting provider technology platform that allows end user computing devices 104 or agent computing devices 212 to upload, publish, store, view, and download content data, such as alphanumeric text data, images, and audiovisual data. The technology platform 270 & 272 can include a remote host computing device 270 & 727 implemented as a physical or virtual server.

The external systems 270 & 272 can also represent other types of data sources, users, consumers, customers, enterprises, and groups of any size. In at least one example, the external systems 270 & 272 represent remote terminal utilized by the enterprise system 200 in serving users 110. In another example, the external systems 270 &272 represent electronic systems for processing payment transactions. The system may also utilize software applications that function using external resources 270 &272 available through a third-party provider, such as a Software as a Service ("SaasS"), Platform as a Service ("PaaS"), or Infrastructure as a Service ("IaaS") provider running on a third-party cloud service computing device. For instance, a cloud computing device may function as a resource provider by providing remote data storage capabilities or running software applications utilized by remote devices.

The embodiment shown in FIG. 1 is not intended to be limiting, and one of ordinary skill in the art will appreciate that the system and methods of the present invention may be implemented using other suitable hardware or software configurations. For example, the system may utilize only a single computing system 206 implemented by one or more physical or virtual computing devices, or a single computing device may implement one or more of the computing system 206, agent computing device 206, or user computing device 104 & 106.

Capturing Hosted Content Data

Hosted content data is generated by users who are also known as hosted content data sources. Users can be individuals or entities and include agents of an enterprises. Users and enterprises register and create an account with a remote hosting provider that provides and maintains the technology platform 270 & 272 for uploading, publishing, storing, viewing, or downloading hosted content data. The technology platform 270 & 272 stores content and other data uploaded by end users, authenticates end users, and processes incoming requests to download hosted content data, among other functions. End user computing devices 104 and agent computing devices 212 interface with the technology platform 270 & 272 using a software application, such as an Internet browser application or a remote hosting provider mobile software application.

Each end user 110, agent 210, or enterprise 200 is associated with a unique user identifier ("UID") (e.g., a screen name, email address, user identification number, or account number) as well as associated with authentication credential data (e.g., a password or code) that is used to create an account and access the remote hosting provider technology platform 270 & 272. The technology platform 270 & 272 performs a verification analysis that authenticates end users by comparing the UID and authentication credential data received from end user or agent computing devices 104 & 212 to known UID and authentication credential data stored to the technology platform 270 & 272.

The remote hosting provider optionally authenticates end user or agent computing devices 104 & 212 (collectively "computing devices") by capturing and storing device configuration data to the technology platform 270 & 272. The device configuration data is used to verify an user identity or authenticate the computing device. Device configuration data can include, without limitation: (i) an unique identifier for the user or agent computing device (e.g., an identifier hardcoded into a communication subsystem of the end user or agent computing device); (ii) a MAC address for the local network of an end user or agent computing device (e.g., a router MAC address); (iii) copies of key system files that are unlikely to change between instances when a user accesses the remote hosting provider system; (iv) a list of applications running or installed on the computing device; and (v) any other data useful for evaluating users and authenticating a user or user computing device.

The user or agent computing device 104 & 212 optionally authenticates to the remote hosting provider technology platform 270 & 272 if, for instance, the end user, agent, or enterprise has an existing electronic account with the remote hosting provider. The user or agent computing device 104 & 212 transmit an authentication request message that includes a UID, authentication credential data, and/or device configuration data to the technology platform 270 & 272. The technology platform 270 & 272 passes an user authentication request message to an identity management service that conducts a verification process to verify the identity of the end user (e.g., an individual end user or enterprise agent) and/or to verify the computing device by comparing the received data to known UID, authentication credential data, and/or device configuration data stored to the technology platform 270 & 272. The identity management service returns an authentication decision message indicating that the authentication passed or failed.

The technology platform 270 & 272 stores user parameter data that defines data attributes, permissions, or settings for an end user, agent, or enterprise remote hosting provider electronic account. The user parameter data includes, without limitation, relational data that defines a list of other electronic accounts to which a particular user account is connected, such as a list of UIDs stored to a database. In this manner, networks of user electronic accounts are created.

Once authenticated, an end user or agent computing devices 104 & 212 transmits a hosted content data request to the technology platform 270 & 272 that includes an UID and an Internet Protocol ("IP") address. The technology platform 270 & 272 returns, among other data, hosted content data associated with other accounts to which the user, agent, or enterprise is connected. In this manner, the end user or agent computing device 104 & 212 receives a hosted content data stream that can be continuously updated as more recent content data is uploaded to the technology platform 270 & 272 by other users.

An end user or agent computing device 104 & 212 can upload content data to the technology platform 270 & 272 that includes, without limitation, alphanumeric text data, image data, or audiovisual data. The technology platform 270 & 272 stores the uploaded content data to a content database record with: (i) a source UID data that is an UID for the account associated with the end user or agent computing device 104 & 212 that uploaded the content data. The uploaded content data can be, for instance, a "post," "tweet" (i.e., a short message), or other communication that uses text, images, or videos to communicate ideas and expressions, such as news and announcements, or that are intended to request information, elicit a response, or facilitate engagement between users.

The technology platform 270 & 272 publishes the stored content data as hosted content data by transmitting the hosted content data to other end user and agent computing devices 104 & 212 either automatically or upon request by end users. The hosted content data can be transmitted, or made available upon request, to all accounts registered with the remote hosting provider or only those accounts connected to the account that uploaded the content data.

Uploaded content data can be optionally associated with accounts other than the source account that uploaded the data by appending one or more account UIDs to the hosted content data as tagged UID data. The associated tagged UID data can be published or transmitted with the hosted content data and viewable to other users such that system users can view connections between user accounts.

In addition to source UID data and tagged UID data, the hosted content data can also be associated, stored to a content database record, published, and transmitted with: (i) source account profile data (e.g., a name, alias, geographic location, image, tag line, slogan, or other data and attributes relating to the source account user); (ii) engagement data generated from engagement messages received by the technology platform from end users, such as data representing a user reaction to the content data (e.g., the user "liked," "loved," or was "angered" by the content data); (iii) relational data (e.g., UIDs connected to, or associated with, the source UID); (iv) hyperlink data, such as a command that when selected, directs an end user or agent computing device to a separate IP address or universal resource locator address for display of content); (v) display data required for display of the hosted content data (e.g., instructions compatible with, and readable by, a particular Internet browser or software application for rendering a user interface, including graphical elements like icons, frames, etc., digital images, text, numbers, colors, fonts, or layout data representing the orientation and arrangement graphical elements and alphanumeric data on a user interface screen); (vi) sequencing data that can be a date and time stamp when the content data was generated by the agent or end user computing device, transmitted by the agent or end user computing device, or received by the technology platform 270 & 272; (vii) user messaging data representing a comment or response to hosted content data uploaded to the technology platform 270 & 272 by the enterprise or representing a direct message to the enterprise; and (viii) content data type representing and identifier that indicates the type of associated user messaging data as being a response, comment, direct message, or the like.

End user or agent computing devices 104 & 212 can further upload user content data that includes alphanumeric text data, image data, or audiovisual data. The user content data is associated with both source UID data for the account that generated the user content data and recipient UID data representing an UID for an end user, agent, or enterprise account to which the user content data is directed. The user content data is stored as hosted content data to the technology platform 270 & 272 and made available for viewing and download by an user or agent computing device 104 & 212 associated with the recipient UID data. The user content data can represent a "comment" or response associated with a "post" or "tweet" such that the user content data is associated with existing hosted content data that was previously published or transmitted to other users by the technology platform 270 & 272. In other cases, the user content data represents a "direct message" transmitted to, or made available for download by, an agent or end user computing device 104 & 212 and that is that is not publicly viewable by other users of the technology platform 270 & 272.

An enterprise captures hosted content data (including user messaging data) that is associated with recipient UID data or tagged UID data for the enterprise account UID. The hosted content data is aggregated, filtered, classified, and analyzed to determine polarity, sentiment, and data subject identifiers. The enterprise captures hosted content data using a Remote Host application programming interface ("API") that facilitates communication and implements an interface between the technology platform and an enterprise computing system. The Remote Host API is a software service that is generally not directly accessed by end users or agents but instead utilized by other software applications. The Remote Host API accepts commands, requests, and other messages and data from software applications running on an enterprise system 200 and formats the messages and data for processing by the remote hosting provider technology platform 270 & 272. Likewise, the Remote Host API accepts messages and data from the technology platform and formats the messages and data for processing by the enterprise system 200.

The Remote Host API can be configured to implement a variety of functions, such as facilitating authentication of an agent or agent computing device to authorize the enterprise to access the remote hosting provider technology platform 270 & 272 and facilitating the capture or downloading of hosted content data for processing by the enterprise system 200. For instance, an agent 210 may select a "login," "analyze," or other function shown on a graphical user interface displayed on the agent computing device 212. In response, the agent computing device 212 transmits a login message to the Remote Host API, which then retrieves an UID, authentication credential data, and/or device configuration data that is used to generate an authentication request message. The Remote Host API transmits the authentication request message to the technology platform to initiate the verification process. Thus, the Remote Host API provides an efficient interface between computing devices and software applications running on the enterprise system and the remote hosting provider technology platform 270 & 272.

To capture hosted content data, the Remote Host API transmits a remote content data request message to the remote hosting provider technology platform 270 & 272. The remote content data request message can be transmitted to the technology platform 270 & 272 when, for example, an agent 210 either: (i) launches a software application on the agent computing device 212 that is utilized to process, filter classify, determine the polarity of, or reduce aggregated hosted content data; or (ii) selects a command on a GUI that is used to analyze the hosted content data.

The remote content data request message includes an enterprise identifier, such as an UID for an enterprise electronic account with the remote hosting provider, and requested content range data. The technology platform 270 & 272 utilizes the enterprise UID to retrieve and return only hosted content data relating to an enterprise that is requesting the hosted content data. In response to the remote content data request message, the Remote Host API receives one or more hosted content data packets that each represent user messages or published content data relating to the enterprise. That is, the hosted content data can be, for example: (i) user posts that include tagged UID data corresponding to the enterprise account UID; (ii) comments or responses to previously published hosted content data relating to an enterprise; or (iii) a direct message sent to an enterprise.

The requested content range data is a parameter or specification that defines the scope of content data packet retrieval from the technology platform 270 & 272. The requested content range data can be, for instance: (i) a number of hosted content packets to retrieve; (ii) a date range of hosted content data packets to retrieve (e.g., all posts or published content data generated on a given date or in a given date range); or (iii) one or more UIDs such that only hosted content data that includes the one or more UIDs, including tagged UID data or source UID data, will be retrieved by the technology platform 270 & 272 and transmitted to the Remote Host API.

The hosted content data packets retrieved by the technology platform 270 & 272 and transmitted to the Remote Host API can include a variety of data, such as: (i) alphanumeric data, image data, or audiovisual data comprising hosted content data; (ii) user messaging data that includes alphanumeric text data, image data, or audio visual data; (iii) sequencing data, such as time and date data, or an alphanumeric identifier indicating a sequence of a hosted content data packets relative to other packets; (iv) source UID data; (v) tagged UID data; (vi) source account profile data; (vii) engagement data; (viii) relational data; (ix) hyperlink data; (x) display data; and (xi) content data type data.

The enterprise system 200 may receive numerous hosted content data packets for processing using artificial intelligence, natural language processing, sentiment analysis technology. The hosted content data packets can be stored directly to an enterprise system or stored to a third-party database, such as a cloud service storage or software as a service provider. The hosted content data packets are stored to a relational database that maintains the hosted content data packets in a manner that permits the hosted content data packets to be associated with certain information, such as one or more polarity identifiers, sentiment identifiers, or subject identifiers. Storage to a relational database further facilitates expedient sorting of the data, such as retrieving hosted content data packets having temporal data within a predefined range of dates.

Natural Language Processing

The reduction software service processes the hosted content data using natural language processing technology that is implemented by one or more artificial intelligence software applications and systems. The artificial intelligence software and systems are in turn implemented using neural networks. Iterative training techniques and training data instill neural networks with an understanding of individual words, phrases, subjects, sentiments, and parts of speech. As an example, training data is utilized to train a neural network to recognize that phrases like "locked out," "change password," or "forgot login" all relate to the same general subject matter when the words are observed in proximity to one another at a significant frequency of occurrence.

The reduction software service utilizes one or more known techniques to perform a subject classification analysis that identifies subject classification data. Suitable known techniques can include Latent Semantic Analysis ("LSA"), Probabilistic Latent Semantic Analysis ("PLSA"), Latent Dirichlet Allocation ("LDA"), or a Correlated Topic Model ("CTM"). The hosted content data is first pre-processes using a reduction analysis to create reduced hosted content data, which is streamlined by performing one or more of the following operations, including: (i) tokenization to transform the hosted content data into a collection of words or key phrases having punctuation and capitalization removed; (ii) stop word removal where short, common words or phrases such as "the" or "is" are removed; (iii) lemmatization where words are transformed into a base form, like changing third person words to first person and changing past tense words to present tense; (iv) stemming to reduce words to a root form, such as changing plural to singular; and (v) hyponymy and hypernym replacement where certain words are replaced with words having a similar meaning so as to reduce the variation of words within the hosted content data.

In one embodiment, the reduction software service processes the reduced hosted content data packets by performing a Latent Drichlet Allocation ("LDA") analysis to identify subject classification data that includes one or more subject identifiers (e.g., topics addressed in the underlying hosted content data). Performing the LDA analysis on the reduced hosted content data may include transforming the hosted content data into an array of text data representing key words or phrases that represent a subject (e.g., a bag-of-words array) and determining the one or more subjects through analysis of the array. Each cell in the array can represent the probability that given text data relates to a subject. A subject is then represented by a specified number of words or phrases having the highest probabilities (i.e., the words with the five highest probabilities), or the subject is represented by text data having probabilities above a predetermined subject probability threshold.

In other embodiments, subject may each include one or more subject vectors, where each subject vector includes one or more identified keywords within the reduced hosted content data as well as a frequency of the one or more keywords within the reduced textual data. The subject vectors are analyzed to identify words or phrases that are included in a number of subject vectors having a frequency below a specified threshold level that are removed from the subject vectors. In this manner, the subject vectors are refined to exclude text data less likely to be related to a given subject. To reduce an effect of spam, the subject vectors may be analyzed, such that if one subject vector is determined to use text data that is rarely used in other subject vectors, then the text data is marked as having a poor subject assignment and is removed from the subject vector.

Further, in one embodiment, any unclassified hosted content data is processed to produce reduced hosted content data. Then words within the reduced hosted content data are mapped to integer values, and the hosted content data is turned into a bag-of-words that includes integer values and the number of times the integers occur in hosted content data. The bag-of-words is turned into a unit vector, where all the occurrences are normalized to the overall length. The unit vector may be compared to other subject vectors produced from an analysis of hosted content data by taking the dot product of the two unit vectors. All the dot products for all vectors in a given subject are added together to provide a strength score for the given subject, which is taken as subject weighting data.

To illustrate generating subject weighting data, for any given subject there may be numerous subject vectors. Assume that for most of subject vectors, the dot product will be close to zero—even if the given hosted content data addresses the subject at issue. Since there are some subjects with numerous subject vectors, there may be numerous small dot products that are added together to provide a significant score. Put another way, the particular subject is addressed consistently through several documents, instances, or sessions of the hosted content data, and the recurrence of the carries significant weight.

In another embodiment, a predetermined threshold may be applied where any dot product that has a value less than the threshold is ignored and only stronger dot products above the threshold are summed for the score. In another embodiment, this threshold may be empirically verified against a training data set to provide a more accurate subject analyses.

In another example, a number of subjects may be widely different, with some subjects having orders of magnitude less subject vectors than others. The weight scoring may significantly favor relatively unimportant subjects that occur frequently in the hosted content data given the differences in the number of subject vectors. To address this problem, a linear scaling on the dot product scoring based on the number of subject vectors may be applied. The result provides a correction to the score so that important but less common subjects are weighed more heavily.

Once all scores are calculated for all subjects, then subjects may be sorted, and the most probable subjects are returned. The resulting output provides an array of subjects and strengths. In another embodiment, hashes may be used to store the subject vectors to provide a simple lookup of text data (e.g., words and phrases) and strengths. The one or more subject vectors can be represented by hashes of words and strengths, or alternatively an ordered byte stream (e.g., an ordered byte stream of 4-byte integers, etc.) with another array of strengths (e.g., 4-byte floating-point strengths, etc.).

The reduction software service can also use term frequency-inverse document frequency ("tf-idf") software processing techniques to generating weighting data that weights words or particular subjects. The tf-idf is represented by a statistical value that increases proportionally to the number of times a word appears in the hosted content data. This frequency is offset by the number of separate hosted content data instances that contain the word, which adjusts for the fact that some words appear more frequently in general across multiple discussions or documents. The result is a weight in favor of words or terms more likely to be important within the hosted content data, which in turn can be used to weigh some subjects more heavily in importance than others. To illustrate with a simplified example, the tf-idf might indicate that the term "website" carries significant weight within hosted content data. To the extent any of the subjects identified by an LDA analysis include the term "website," that subject can be assigned more weight by the reduction software service.

The reduction software service analyzes the hosted content data through, for example, semantic segmentation to identify attributes of the hosted content data. Attributes include, for instance, parts of speech, such as the presence of particular interrogative words, such as who, whom, where, which, how, or what. In another example, the hosted content data is analyzed to identify the location in a sentence of interrogative words and the surrounding context. For instance, sentences that start with the words "what" or "where" are more likely to be questions than sentence having these words placed in the middle of the sentence (e.g., "I don't know what to do," as opposed to "What should I do?" or as another example, "Where is the word?" as opposed to "Locate where the word appears."). In that case, the closer the interrogative word is to the beginning of a sentence, the more weight is given to the probability it is a question word when applying neural networking techniques.

The reduction software service can also incorporate Part of Speech ("POS") tagging software code that assigns words a parts of speech depending upon the neighboring words, such as tagging words as a noun, pronoun, verb, adverb, adjective, conjunction, preposition, or other relevant parts of speech. The reduction software service can utilize the POS tagged words to help identify questions and subjects according to pre-defined rules, such as recognizing that the word "what" followed by a verb is also more likely to be a question than the word "what" followed by a preposition or pronoun (e.g., "What is this?" versus "What he wants is an answer.").

POS tagging in conjunction with Named Entity Recognition ("NER") software processing techniques can also be used by the reduction software service to identify various hosted content sources within the hosted content data. NER techniques are utilized to classify a given word into a category, such as a person, product, organization, or location. Using POS and NER techniques to process the hosted content data allow the reduction software service to identify particular words and text as a noun and as representing a person participating in the discussion (i.e., a hosted content source).

The reduction software service can also perform a sentiment analysis to determine sentiment from the hosted content data. Sentiment can indicate a view or attitude toward a situation or an event. Further, identifying sentiment in data can be used to determine a feeling, emotion or an opinion. The sentiment analysis can apply rule-based software applications or neural networking software applications, such as convolutional neural networks (discussed below), a lexical co-occurrence network, and bigram word vectors to perform sentiment analysis to improve accuracy of the sentiment analysis.

The sentiment analysis can also determine particular emotion associated with the hosted content data, such as optimistic, excited, frustrated, or a range of other emotions. Prior to performing a sentiment analysis, the hosted content data is subject to the reduction analysis that can include tokenization, lemmatization, and stemming. A type of sentiment analysis includes a polarity analysis that determines the polarity of hosted content data according to a scale defined by the enterprise, such as classifying hosted content data as being very positive, somewhat positive, neutral, somewhat negative or very negative.

Polarity-type sentiment analysis (i.e., a polarity analysis) can apply a rule-based software approach that relies on lexicons, or lists of positive and negative words and phrases that are assigned a polarity score. For instance, words such as "fast," "great," or "easy" are assigned a polarity score of certain value while other words and phrases such as "failed," "lost," or "rude" are assigned a negative polarity score. The polarity scores for each word within the tokenized, reduced hosted content data are aggregated to determine an overall polarity score and a polarity identifier. The polarity identifier can correlate to a polarity score or polarity score range according to settings predetermined by an enterprise. For instance, a polarity score of +5 to +9 may correlate to a polarity identifier of "positive," and a polarity score of +10 or higher correlates to a polarity identifier of "very positive."

To illustrate a polarity analysis with a simplified example, the words "great" and "fast" might be assigned a positive score of five (+5) while the word "failed" is assigned a score of negative ten (−10) and the word "lost" is assigned a score of negative five (−5). The sentence "The agent failed to act fast" could then be scored as a negative five (−5) reflecting an overall negative polarity score that correlatives to a "somewhat negative" polarity indicator. Similarly, the sentence "I lost my debit card, but the agent was great and got me a new card fast" might be scored as a positive five (+5), thereby reflecting a positive sentiment with a positive polarity score and polarity identifier.

The reduction software service can also apply machine learning software technology to determine polarity and sentiment. Machine learning techniques also start with a reduction analysis. Words are transformed into numeric values using vectorization that is accomplished through a "bag-of-words" model, Word2Vec techniques, or other techniques known to those of skill in the art. Word2Vec, for example, can receive a text input (e.g., a text corpus from a large data source) and generate a data structure (e.g., a vector representation) of each input word as a set of words. The data structure may be referred to herein at a "model" or "Word2Vec model."

Each word in the set of words is associated with a plurality of attributes. The attributes can also be called features, vectors, components, and feature vectors. For example, the data structure may include features associated with each word in the set of words. Features can include, for example, polarity (negative or positive), gender, nationality, etc. that describe the words. Each of the features may be determined based on techniques for machine learning (e.g., supervised machine learning) and trained based on association with polarity or sentiment.

Training the neural networks is particularly important for sentiment and polarity analysis to ensure parts of speech such as subjectivity, industry specific terms, context, idiomatic language, or negation are appropriately processed. For instance, the phrase "Your rates are lower than competitors" could be a favorable or unfavorable comparison depending on the particular context, which should be refined through neural network training. The neural network training might determine that the phrase has a positive polarity score when appearing proximal to terms such as "home," "loan," or "mortgage." But the neural network training might also determine that the phrase has an overall negative polarity score when the phrase appears proximal to terms such as "savings account" or "investment return."

Machine learning techniques for sentiment analysis can utilize classification neural networking techniques where a corpus of hosted content data is, for example, classified according to polarity (e.g., positive, neural, or negative) or classified according to emotion (e.g., satisfied, contentious, etc.). Suitable neural networks can include, without limitation, Naive Bayes, Support Vector Machines using Logistic Regression, convolutional neural networks, a lexical co-occurrence network, bigram word vectors, Long Short-Term Memory, recurrent neural networks, or recombinant neural networks.

Neural networks are trained using training set hosted content data that comprise sample tokens, phrases, sentences, paragraphs, or documents for which desired subjects, hosted content sources, interrogatories, or sentiment values are known. A labeling analysis is performed on the training set hosted content data to annotate the data with known subject labels, interrogatory labels, hosted content source labels, or sentiment labels, thereby generating annotated training set hosted content data. For example, a person can utilize a labeling software application to review training set hosted content data to identify and tag or "annotate" various polarities, sentiments, parts of speech, subjects, interrogatories, or hosted content sources.

The training set hosted content data is then fed to the reduction software service neural networks to identify polarity, sentiment, parts of speech, subjects, interrogatories, or hosted content sources and corresponding probabilities that the identified attributes are correct. For example, the analysis might identify that particular text represents a positive polarity with a 35% probability. If the annotations indicate the text does, in fact, have a positive polarity, an error rate can be taken to be 65% or the difference between the calculated probability and the known certainty. Then parameters to the neural network are adjusted (i.e., constants and formulas that implement the nodes and connections between node), to increase the probability from 35% to ensure the neural network produces more accurate results, thereby reducing the error rate. The process is run iteratively on different sets of training set hosted content data to continue to increase the accuracy of the neural network.

For some embodiments, the reduction software service can be configured to determine relationships between and among subject identifiers, polarity identifiers, and sentiment identifiers. Determining relationships among identifiers can be accomplished through techniques, such as determining how often two identifier terms appear within a certain number of words of each other in a set of hosted content data packets. The higher the frequency of such appearances, the more closely the identifiers would be said to be related.

A useful metric for degree of relatedness that relies on the vectors in the data set as opposed to the words is cosine similarity. Cosine similarity is a technique for measuring the degree of separation between any two vectors, by measuring the cosine of the vectors' angle of separation. If the vectors are pointing in exactly the same direction, the angle between them is zero, and the cosine of that angle will be one (1), whereas if they are pointing in opposite directions, the angle between them is "pi" radians, and the cosine of that angle will be negative one (−1). If the angle is greater than pi radians, the cosine is the same as it is for the opposite angle; thus, the cosine of the angle between the vectors varies inversely with the minimum angle between the vectors, and the larger the cosine is, the closer the vectors are to pointing in the same direction.

Artificial Intelligence

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor ("KNN"), and the like. Additionally or alternatively, the machine learning algorithm may include one or more regression algorithms configured to output a numerical value in response to a given input. Further, the machine learning may include one or more pattern recognition algorithms—e.g., a module, subroutine or the like capable of translating text or string characters and/or a speech recognition module or subroutine. The machine learning modules may include a machine learning acceleration logic (e.g., a fixed function matrix multiplication logic) that implements the stored processes or optimizes the machine learning logic training and interface.

The machine learning modules utilized by the present systems and methods can be implemented with neural networking techniques. Neural networks learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, such as an acyclic graph with nodes arranged in layers.

A feedforward network 260 (as depicted in FIG. 2A) may include a topography with a hidden layer 264 between an input layer 262 and an output layer 266. The input layer 262 includes input nodes 272 that communicate input data, variables, matrices, or the like to the hidden layer 264 that is implemented with hidden layer nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge.

In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers. That is, the hidden layer 264 implements activation functions between the input data communicated from the input layer 262 and the output data communicated to the nodes 276 of the output layer 266.

It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem.

Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient (e.g., a propagated value). The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network ("CNN"). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program.

A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An example convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
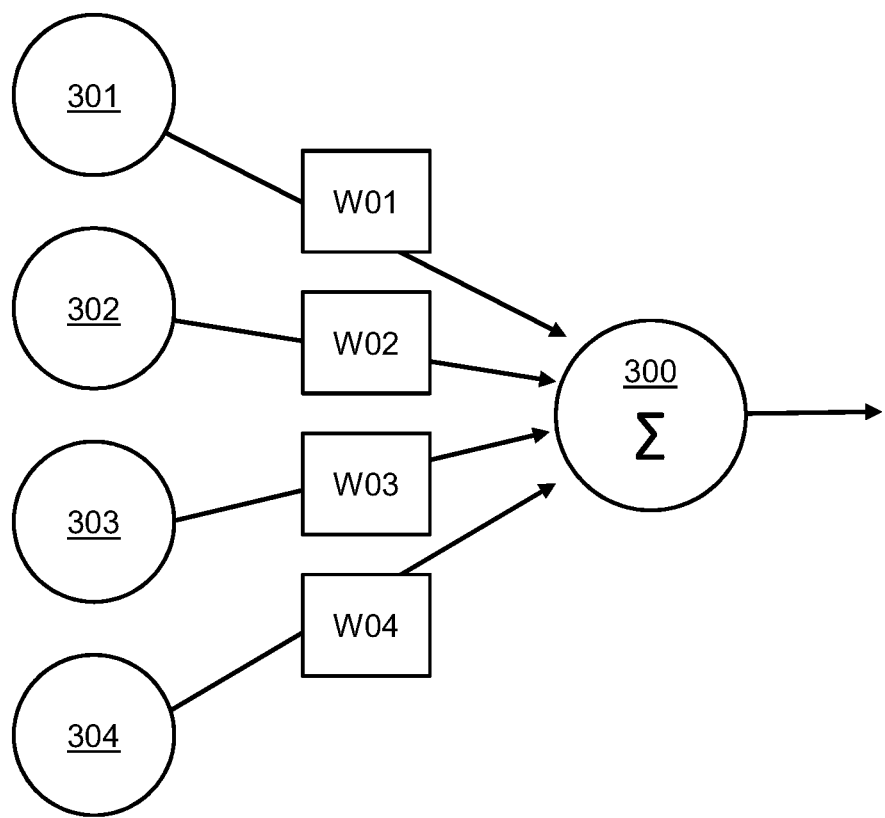
FIG. 3 is a diagram representing an example weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network ("RNN"). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter. That is, at least a portion of the output data from the RNN may be used as feedback or input in calculating subsequent output data. In some embodiments, the machine learning module may include an RNN configured for language processing (e.g., an RNN configured to perform statistical language modeling to predict the next word in a string based on the previous words). The RNN(s) of the machine learning program may include a feedback system suitable to provide the connection(s) between subsequent and previous layers of the network.

Figure 4:
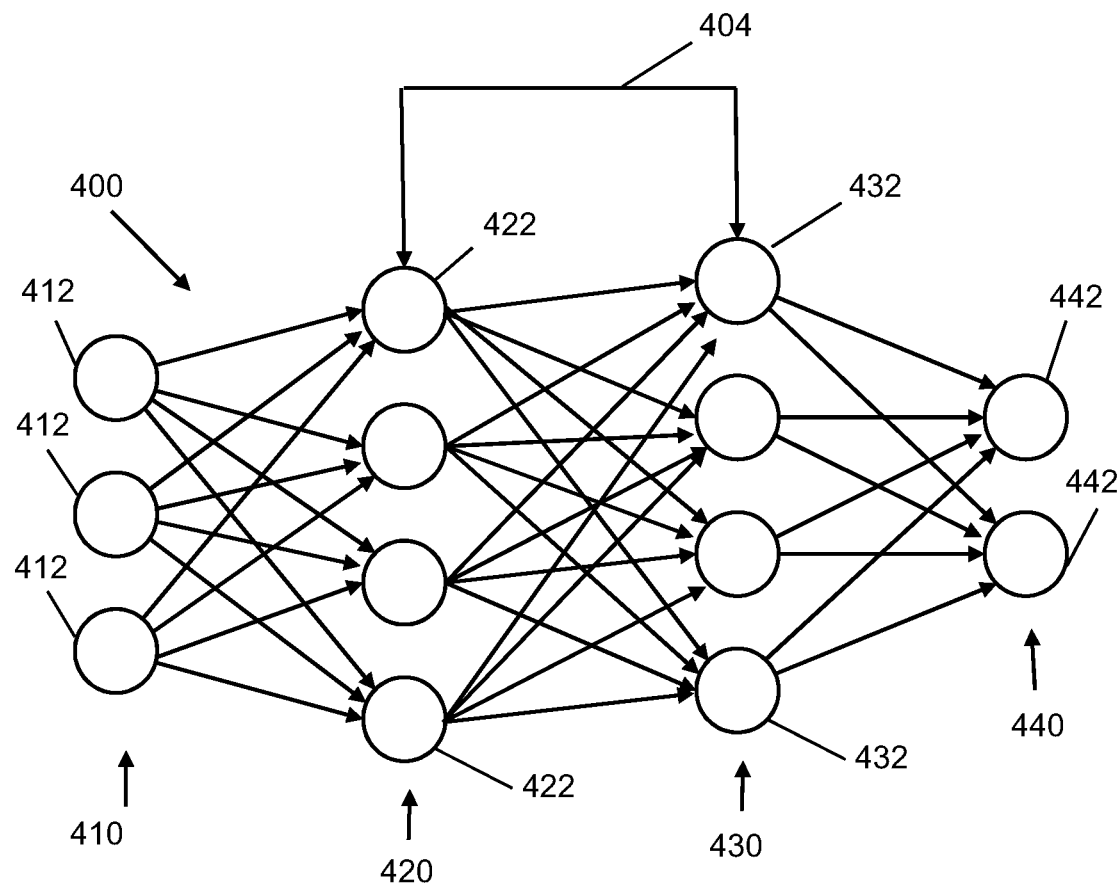
FIG. 4 is a diagram of a Recurrent Neural Network RNN, according to at least one embodiment, utilized in machine learning.

An example RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more nodes of a subsequent layer may provide or communicate a parameter or other data to a previous layer of the RNN network 400. Moreover, in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them (i.e., nodes of nonsequential layers of the RNN 400).

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks (e.g., by providing a known input vector, including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers).

Generally, the neural network(s) of the machine learning program may include a relatively large number of layers (e.g., three or more layers) and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Figure 5:
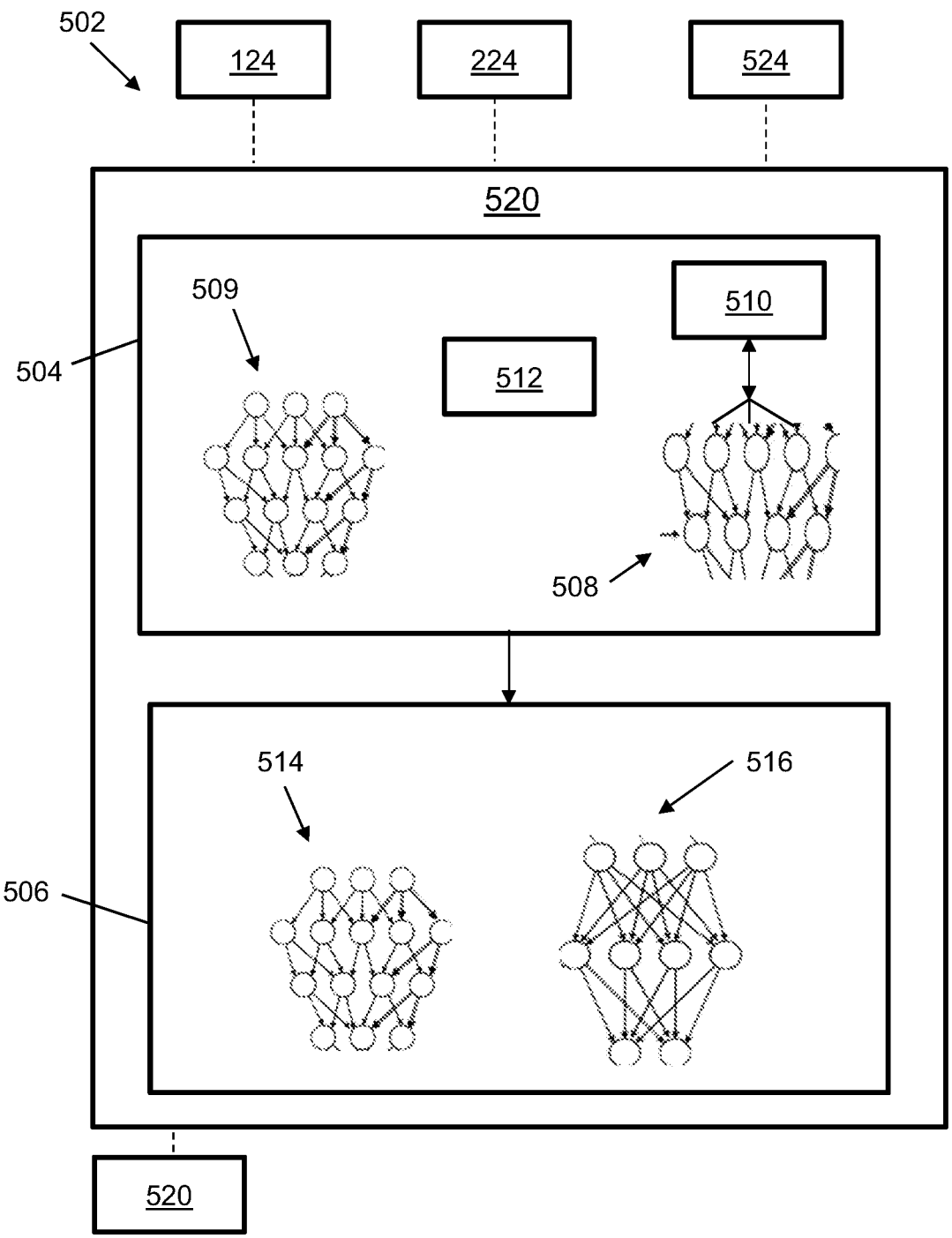
FIG. 5 is a schematic logic diagram of an artificial intelligence program including a front-end and a back-end algorithm.

Referring now to FIG. 5 and some embodiments, an artificial intelligence program 502 may include a front-end algorithm 504 and a back-end algorithm 506. The artificial intelligence program 502 may be implemented on an AI processor 520. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform preprocessing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training.

In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g, CNN 514) or dense networks (e.g., dense networks 516), as described herein.

For instance and in some embodiments of the AI program 502, the program may be configured to perform unsupervised learning, in which the machine learning program performs the training process using unlabeled data (e.g., without known output data with which to compare). During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known (e.g., a mix of labeled and unlabeled data having the same distribution).

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory ("LSTM") RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression ("LR"), Naive-Bayes, Random Forest ("RF"), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks known to those of skill in the art.

Figure 6:
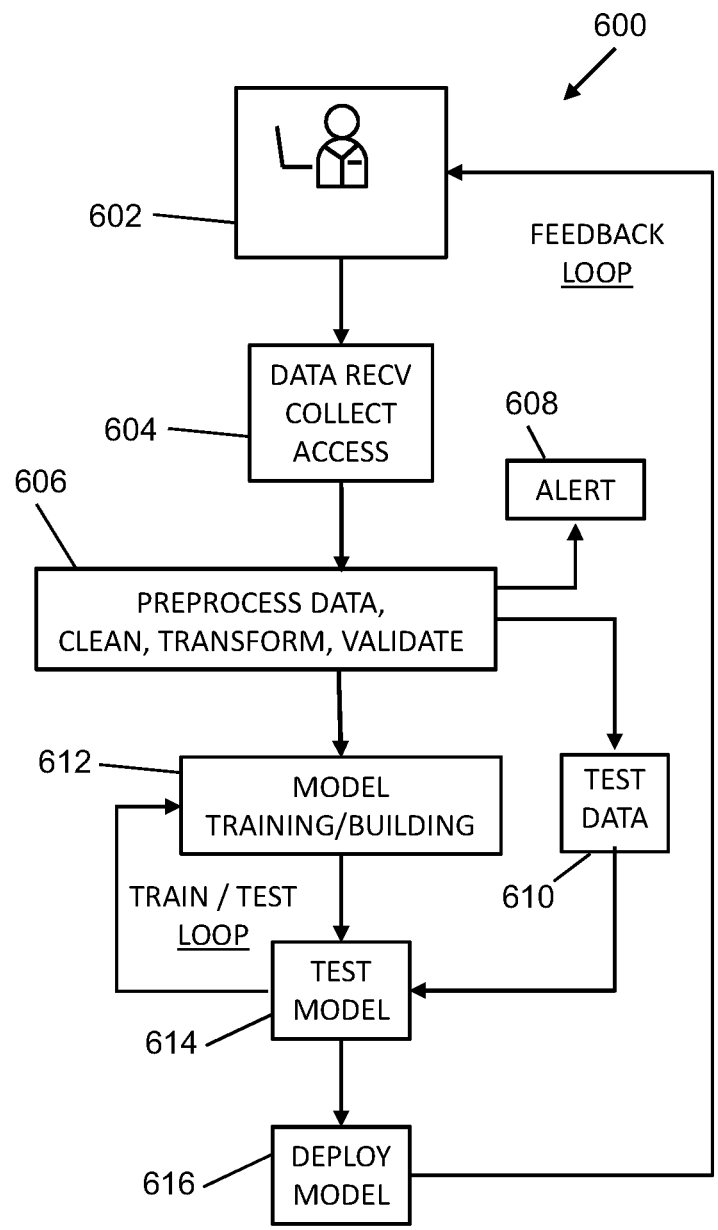
FIG. 6 is a flow chart representing a method model development and deployment by machine learning.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, user evaluation data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated.

Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Hosted Content Data Processing

Figure 7:
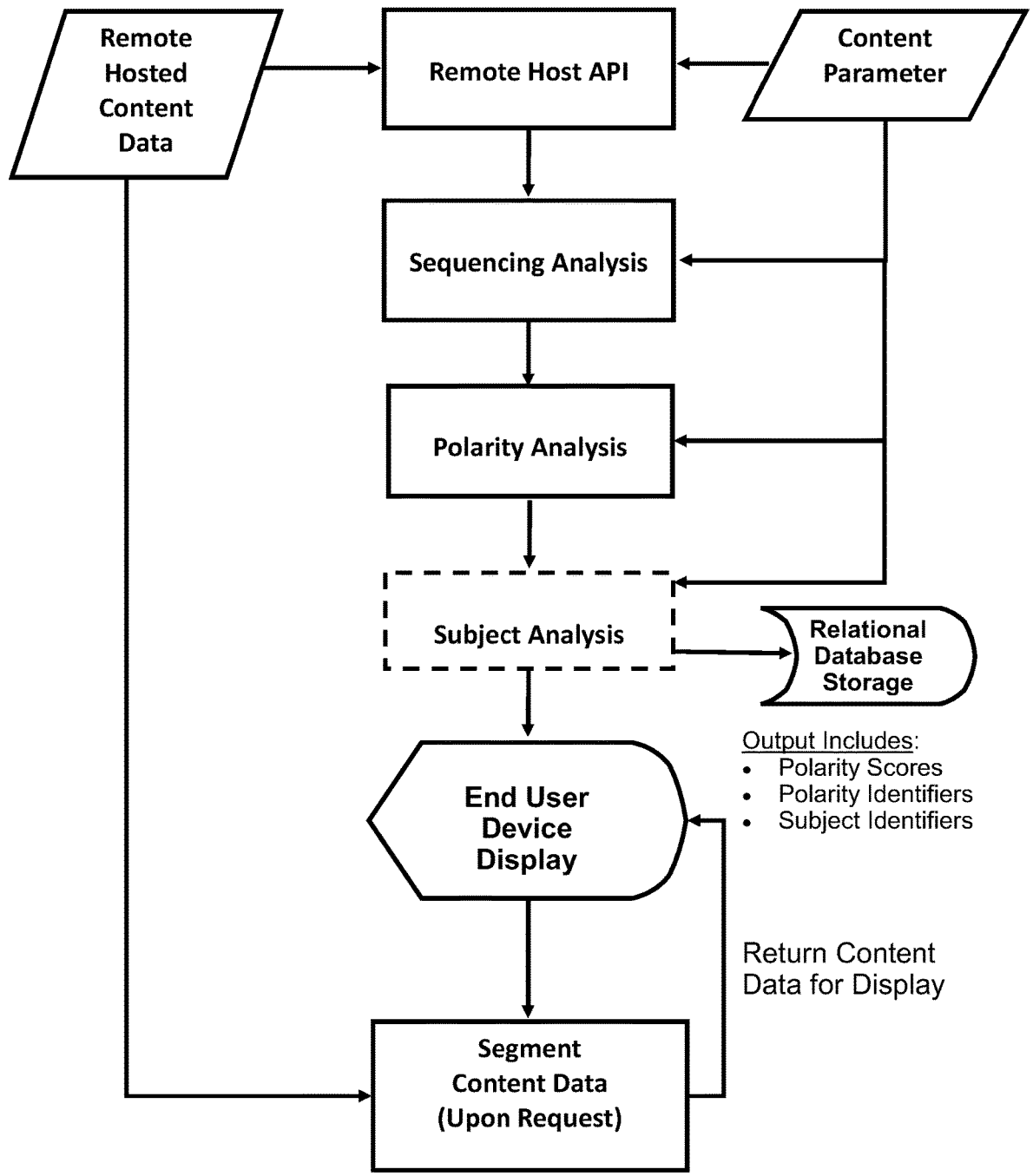
FIG. 7 is a flow chart representing a method for content data analysis according to one embodiment.

One example process for analyzing hosted content data is shown in FIG. 7. Hosted content data is requested from a remote hosting provider and received by the Remote Host API as a series of hosted content data packets. The hosted content data packets are sequenced into discrete ranges or categories where each range or category is labeled with a sequencing identifier. The hosted content data packets for each sequence identifier are analyzed using a polarity analysis to determine a polarity score or a polarity identifier for the given sequence identifier.

The hosted content data packets for each sequence identifier are optionally further analyzed using a sentiment analysis to determine a sentiment identifier and/or a subject classification analysis to determine a subject identifier. In this manner, the hosted content data for each sequence identifier is characterized with regard to polarity, sentiment, and subjects.

The results are output to a polarity explorer GUI to make the polarity, sentiment, and subjects more accessible to agent end users. This allows changes in the hosted content data attributes to be tracked according to particular ranges or categories, such as tracking data polarity scores, polarity identifiers, or subjects over time. This in turn allows an enterprise to identify beneficial or problematic trends, resolve problems, or design and implement system enhancement.

To illustrate with a simplified example, in one embodiment, the hosted content data packets represent alphanumeric data messages uploaded to a remote hosting provider technology platform by end users who are customers of an enterprise. The hosted content data is captured by the enterprise Remote Host API and sequenced according to time periods, such as sequencing each hosted content data packet according to the day it was uploaded to the remote hosting provider technology platform. In that case, the enterprise determines: (i) a polarity for each day as being positive or negative; (ii) a polarity score for each day; and (iii) one or more subject identifiers for each day.

Continuing with the foregoing example, the first day can have a positive polarity score of plus ten (+10) with a subject identifier of "mobile app." The second day can have a negative polarity score of minus five (−5) also with a subjective identifier of "mobile app." The enterprise then determines that a change or problem with the enterprise's mobile software application has occurred and should be investigated for diagnosis and resolution. As another example, the enterprise may determine that the subject identifier for the majority of days in a given month is the phrase "online customer support" with the polarity score trending upward throughout the month. In that case, the enterprise may determine that recent temporary changes to its online customer support system are being positively perceived by customer end users and, therefore, the changes should be implemented on a long-term rather than temporary basis.

Conventional techniques for receiving content data by an enterprise rely on an enterprise to transmit specific requests for content data to end users. The requests are generally closed ended and seek content relating to a particular subject, such as a series of questions inquiring about a service offered by the enterprise (e.g., "Did your online transfer succeed?" or "Did the enterprise agent resolve your problem logging into the online transfer system?"). The content data received by an enterprise is thus focused on the particular topic(s) of the request such as "online transfers," and the enterprise would not receive content data relating to other products, services, or systems. This in turn limits the enterprise's ability to identify problems or beneficial aspects of its system, products, or services.

By contrast, end users upload content to a remote hosting service provider, such as a social media platform, in an open ended manner that is not defined by or constrained as a response to a particular inquiry or request from an enterprise. In fact, the technology platform interfaces are expressly designed for the purpose of receiving and hosting such open ended content data and making the hosted content data available for transmission and download to broad spectrums of end users. The technology platform interfaces include tools that allow end users to upload freeform alphanumeric text data, image data, audio visual data, hyperlink data, and to share content data from other end users and sources, among other functions.

The technology platform interfaces further include functions that permit end users to establish connections between end user accounts and transmit messaging data to engage between and among end users, including responses and comments to hosted content data. For instance, end users have an opportunity to react or comment on an announcement uploaded by an enterprise to the remote hosting provider technology platform even if the announcement did not solicit or request a response. The systems and methods disclosed herein enable enterprises to capture, aggregate, classify, analyze, and display the open ended hosted content data to make it more accessible to enterprise end users.

Turning again to FIG. 7, the Remote Host API first transmits a remote content data request to the hosting service provider. The remote content data request includes an enterprise identifier, such as an UID, as well as requested content range data. The technology platform accesses and retrieves the hosted content data stream related to the particular enterprise UID, such as: (i) content data uploaded to the technology platform that is associated with tagged UID data corresponding to the enterprise UID; (ii) responses, comments, or other message data with source UID data corresponding to the enterprise UID (i.e., message data relating to the hosted content data uploaded by the enterprise); and (ii) direct message data associated with the enterprise UID.

In addition to the enterprise identifier, the technology platform further utilizes the requested content data range in to retrieve hosted content data to return to the Remote Host API. The requested content range is parameter data that defines the scope, volume, or range of hosted content data packets to be transmitted to the Remote Host API. For instance, the requested content range can include: (i) temporal data defining a date and/or time range for retrieval of hosted content data packets, such as retrieving all packets created or uploaded to the technology platform between a range of dates and times, before a particular date and time, or after a particular date and time; or (ii) a number of hosted content data packets or posts to retrieve that can correspond to a number of posts or messages to retrieve.

After retrieving the hosted content data packets, the remote hosting provider technology platform transmits to the Remote Host API hosted content data packets that can include, without limitation; (i) alphanumeric data, image data, or audiovisual data comprising hosted content data; (ii) user messaging data that includes alphanumeric text data, image data, or audio visual data; (iii) sequencing data, such as time and date data, or an alphanumeric identifier indicating a sequence of a hosted content data packets relative to other packets; (iv) source UID data; (v) tagged UID data; (vi) source account profile data; (vii) engagement data; (viii) relational data; (ix) hyperlink data; (x) display data; and (xi) content data type data.

Turning again to FIG. 7, the hosted content data packets are passed to the reduction software service that performs one or more of a segmentation operation, a polarity analysis, subject classification analysis, or sentiment analysis. The segmentation operation can utilize the sequencing data from the hosted content data packets that indicate when each hosted data packet was generated, uploaded, or published to the remote hosting provider technology platform. The segmentation operation can also utilize enterprise content parameter data to determine one or more segments for each of the hosted content data packets. The enterprise content parameter data can be a series of sequencing identifiers that each represent a sequence range, such as a series of time period identifiers that reach represent a time period (i.e., a sequence range).

To illustrate the segmentation operation, in one embodiment the enterprise content parameter data is time period identifiers that are each associated with a time period range according to enterprise settings, such as a given day, month, year, or other suitable time period. The sequencing data comprises a time and date when the content data was uploaded to the technology platform. The segmentation operation processes the hosted content data packets to determine whether the sequencing data for each of the hosted content data packets falls within a time period range. The hosted content data packets that fall within a time period range are optionally stored to a database as a production set of hosted content data packets that are available for further processing as a set. Hosted content data packets falling within a time period range are also are associated with a time period identifier corresponding to a time period range. For example, a polarity explorer GUI can include a sequencing identifier, or a time period identifier, of "2020-08-01" that corresponds to a time period range of the entire month of August 2021.

The hosted content data packets associated with a given time period identifier can be stored to a database as a production subset that is available for further processing as a group of feedback data packets. The hosted content data packets are associated with a time period identifier by storing the hosted content data packets and the time period identifiers to a relational database that maintains a relationship between the types of data. The hosted content data packets can also be associated with a time period identifier by appending the time period identifiers to the data that comprises the hosted content data packet.

In another embodiment, the enterprise content parameter data can be one or more UIDs or a content data type. The segmentation operation processes the hosted content data packets to determine whether each packet is includes source UID data or a content data type that corresponds to the UIDs or content data types that comprise the enterprise content parameter data. The hosted content data packets that include source UID data or content type data corresponding to the enterprise content parameter data are stored to a database as a production set of hosted content data packets that are available for further processing as a set. The hosted content data packets are also associated with a source identifier (e.g., a remote hosting provider user name) or a content type identifier (e.g., a direct message or post comment) that can be displayed on a polarity explorer GUI. In this manner, the hosted content data packet polarity, subject(s), or sentiment (s) can be displayed as corresponding to a particular content data source or as representing a type of user message. Those of skill in the art will appreciate that these examples are not intended to be limiting, and the hosted content data can be segmented and displayed according to other categories.

Following the segmentation operation, a reduction software service running on the enterprise system performs a polarity analysis on the hosted content data packets to determine a polarity identifier and/or a polarity score for the hosted content data for each segment, such as each time period identifier. Similarly, the reduction software service optionally performs a sentiment analysis to determine one or more sentiment identifiers for each segment of the hosted content data packets.

Each sentiment identifier corresponds to a qualitative emotive descriptor, such as "satisfied," "optimistic," or "upset." The sentiment identifiers can be defined by the enterprise content parameter data and used as inputs to neural network software applications. The neural network software applications process the hosted content data packets to determine probabilities that the particular sentiment identifiers are represented within the underlying hosted content data. A rule-based software application and the content parameter data are used to select sentiment identifiers that are outputs of the sentiment analysis, such as selecting the three (3) highest probabilities or selecting sentiment identifiers having probabilities above a predetermined sentiment probability threshold.

The system also optionally performs a subject classification analysis using the content data within the hosted content data packets to identify one or more subject identifiers, or topics, included within the underlying alphanumeric portion of content data. To illustrate subject classification, the reduction software service might perform the subject classification analysis for all hosted content data packets for a given year to determine that the relevant subject identifiers include "mobile software application" and "balance transfers." These subject identifiers might be derived if the hosted content data packets include content data describing user experiences with operating an enterprise's mobile software application to perform functions that includes transferring account balances.

The subject classification analysis can be performed using neural networking technology alone or in combination with a rule-based software engine. The number of subject identifiers output by the subject classification analysis can be determined by the enterprise content parameter data. For example, the subject classification analysis may use neural networking technology to generate an output of ten (10) possible subject identifiers that are each associated with a probability of being a subject addressed in the underlying content data. The provider content parameters (i.e., provider settings) can be processes by a rules-based software application that accepts the subject identifiers with the five (5) highest probabilities. Alternatively, the content parameters data can include a subject probability threshold such that all subject identifiers having a probability above the threshold are outputs of the subject classification analysis. The subject identifiers can be displayed along with the sentiment identifiers, polarity identifiers, and polarity scores on a polarity explorer GUI.

For other embodiments, neural networking technology can be used to determine probabilities that the sentiment identifiers relate to a particular subject identifier. Thus, for a subject identifier, sentiments relating to the particular subject identifier are displayed as part of content data attributes for each time period identifier or other segment. To illustrate, a polarity explorer GUID might display a subject identifier of "enterprise website." The sentiment analysis determines that the hosted content data packets for a given time period identifier reflect sentiment identifiers of "upset" and "satisfied." A neural network software application determines that the sentiment identifier of "satisfied" has a substantially higher probability of relating to the subject identifier of "enterprise website." Thus, the sentiment identifier of "satisfied" is included with the descriptor set relating to the selected subject identifier of "enterprise website" and displayed on the polarity explorer GUI.

The outputs of the segmentation operation, polarity analysis, subject classification analysis, and sentiment analysis can be stored to a relational database in a manner that maintains correlation between the various data sets. Thus, the polarity identifiers and scores are stored and correlated with one or more subject identifiers, sentiment identifiers, or time period identifiers. The hosted content data packets can also be stored in a manner that correlates the content data packets to a particular time period identifiers or polarity identifiers, such as where content data packets are stored as a production set or production subset of content data.

Skilled artisans will appreciate that the example process shown in FIG. 7 is not intended to be limiting, and other arrangements of process steps can be used. As an example, the system can first perform a polarity analysis before performing a segmentation operation.

The polarity identifiers, polarity scores, sentiment identifiers, and/or subject identifiers can be displayed alone or in combination on a single GUI. Polarity identifiers as being positive or negative can be represented with text, color, or position of graphical elements, such as a positive or negative polarity icon. Positive polarity can be represented with a first color (e.g., green) and negative polarity can be represented with a second color (e.g., red). Polarity can also be represented with position, such as placing an icon above a line for positive polarity where the position or distance above the line represents the polarity score, or for example, representing negative polarity by placing a particular icon below a line. Those of skill in the art will recognize that other suitable means to represent polarity data can be used.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A system for resolving attributes of hosted content data, the system comprising:
   a first computing device, wherein the first computing device comprises one or more integrated software applications that perform operations comprising:
   (a) transmitting by a Remote Host application programming interface (API), a remote content data request to a remote hosting provider, wherein the remote content data request comprises (i) an enterprise identifier, and (ii) a requested content range;
   (b) receiving by the Remote Host API, in response to the content data request, one or more hosted content data packets, wherein each of the one or more hosted content data packets comprises (i) user content data, and (ii) sequencing data that falls within the requested content range;
   (c) receiving by a reduction software service, (i) the one or more hosted content data packets, and (ii) enterprise content parameter data comprising one or more sequencing identifiers that each represent a sequencing range;
   (d) executing by the reduction software service, operations comprising
      (i) determining whether each of the one or more hosted content data packets falls within a sequencing range by processing the sequencing identifiers and the sequencing data for each of the one or more hosted content data packets,
      (ii) labeling each of the one or more hosted content data packets with at least one of the sequencing identifiers when the one or more hosted content data packets fall within at least one sequencing ranges,
      (iii) performing a polarity analysis that (A) processes the user content data for each of the one or more hosted content data packets labeled with at least one of the sequencing identifiers, and (B) outputs a polarity identifier for each of the one or more sequencing identifiers.

2. The system of claim 1, wherein:
   (a) the polarity analysis further generates a polarity score for each of the one or more sequencing identifiers;
   (b) the sequencing identifiers each correspond to a time period;

(c) the polarity identifiers, polarity scores, and the sequencing identifiers are transmitted to an end user computing device for display on a polarity explorer graphical user interface, wherein the polarity explorer graphical user interface displays each of the one or more sequencing identifiers with the associated polarity identifier and the associated polarity score.

3. The system of claim 1, wherein:
(a) the reduction software service comprises at least one neural network; and
(b) the at least one neural network is used to perform the polarity analysis.

4. The system of claim 3, wherein the at least one neural network comprises a convolutional neural network having at least three intermediate layers.

5. The system of claim 4, wherein the at least one neural network comprises a recurrent neural network having at least three intermediate layers.

6. The system of claim 5, wherein the at least one recurrent neural network comprises a long short-term memory neural network architecture.

7. The system of claim 1, wherein the first computing performs further operations comprising executing a subject analysis that (A) processes the user content data for each of the one or more hosted content data packets labeled with at least one of the sequencing identifiers, and (B) generates at least one subject identifier for each of the one or more sequencing identifiers.

8. The system of claim 7, wherein:
(a) the reduction software service comprises a first neural network that is utilized to execute the subject classification analysis; and
(b) the reduction software service comprises a second neural network that is utilized to execute the polarity analysis.

9. The system of claim 1, wherein the first computing device performs further operations comprising executing a sentiment analysis that (A) processes the user content data for each of the one or more hosted content data packets labeled with at least one of the sequencing identifiers, and (B) generates at least one sentiment identifier for each of the one or more sequencing identifiers.

10. The system of claim 1, wherein:
(a) the one or more sequencing identifiers each represent a time period;
(b) the one or more polarity identifiers and the one or more sequencing identifiers are transmitted to an end user computing device for display; and
(c) the end user computing device generates a polarity explorer graphical user interface (GUI) that is displayed on a display screen of the end user computing device, wherein the polarity explorer GUI displays the one or more polarity identifiers each associated with a time period.

11. A system for resolving attributes of hosted content data, the system comprising:
a first computing device, wherein the first computing device comprises one or more integrated software applications that perform operations comprising:
(a) transmitting by a Remote Host application programming interface (API), a remote content data request to a remote hosting provider, wherein the remote content data request comprises (i) an enterprise identifier, and (ii) a requested content range;
(b) receiving by the Remote Host API, in response to the content data request, one or more hosted content data packets, wherein each of the one or more hosted content data packets comprises (i) user content data, and (ii) sequencing data that falls within the requested content range;
(c) executing by a reduction software service, a segmentation operation that utilizes enterprise content parameter data comprising one or more sequencing identifiers that each represent a sequencing range, wherein executing the segmentation operation comprises the steps of
(i) determining whether each of the one or more hosted content data packets falls within a sequencing range by processing the sequencing identifiers and the sequencing data for each of the of the one or more hosted content data packets, and
(ii) labeling the one or more hosted content data packets with at least one of the sequencing identifiers when the one or more hosted content data packets falls within at least one sequencing range; and
(d) receiving by a reduction software service, the one or more hosted content data packets labeled with at least one sequencing range;
(e) executing by the reduction software service, a polarity analysis that (i) processes the user content data for each of the one or more hosted content data packets labeled with at least one sequencing identifier, and (ii) generates a polarity identifier for each sequencing identifier; and
(f) executing by the reduction software service, a subject classification analysis that (i) processes the user content data for each for each of the one or more hosted content data packets labeled with at least one sequencing identifier, and (ii) generates at least one subject identifier for each sequencing identifier.

12. The system of claim 11, wherein:
(a) the reduction software service comprises at least one neural network; and
(b) the at least one neural network is used to perform the polarity analysis.

13. The system of claim 12, wherein, the at least one neural network comprises a convolutional neural network having at least three intermediate layers.

14. The system of claim 11, wherein:
(a) the reduction software service comprises a first neural network that is utilized to execute the subject classification analysis; and
(b) the reduction software service comprises a second neural network that is utilized to execute the polarity analysis.

15. The system of claim 11, wherein the first computing device performs further operations comprising executing a sentiment analysis that (A) processes the user content data for each of the one or more hosted content data packets labeled with at least one of the sequencing identifiers, and (B) generates at least one sentiment identifier for each of the one or more sequencing identifiers.

16. The system of claim 11, wherein:
(a) the one or more sequencing identifiers each represent a time period;
(b) the one or more polarity identifiers and the one or more sequencing identifiers are transmitted to an end user computing device for display; and
(c) the end user computing device generates a polarity explorer graphical user interface (GUI) that is displayed on a display screen of the end user computing device, wherein the polarity explorer GUI displays the one or more polarity identifiers each associated with a time period.

17. A computer-implemented method for resolving attributes of messaging data, the method comprising:
   (a) transmitting to a remoting hosting provider technology platform, a remote content data request comprising (i) an enterprise identifier, and (ii) a requested content range;
   (b) receiving in response to the content data request, one or more hosted content data packets, wherein each of the one or more hosted content data packets comprises (i) user messaging data, and (ii) sequencing data that falls within the requested content range;
   (c) executing a segmentation operation utilizing enterprise content parameter data that comprises one or more time period identifiers that each represent a time period range, wherein executing the segmentation operation comprises the steps of
      (i) determining whether each of the one or more hosted content data packets falls within a time period range by processing the time period identifiers and the sequencing data for each of the of the one or more hosted content data packets, and
      (ii) labeling the one or more hosted content data packets with at least one of the time period identifiers when the one or more hosted content data packets fans within at least one of the time period ranges; and
   (d) performing a polarity analysis that (A) processes the user messaging data for each of the one or more hosted content data packets labeled with at least one of the time period identifiers, and (B) outputs a polarity identifier and a polarity score for each of the one or more time period identifiers.

18. The computer-implemented method of claim 17 comprising the further operations of:
   (a) transmitting the one or more polarity identifiers and the one or more sequencing identifiers to an end user computing device for display; and
   (b) generating by the end user computing device, a polarity explorer graphical user interface (GUI) that is displayed on a display screen of the end user computing device, wherein the polarity explorer GUI displays the one or more polarity identifiers each associated with a time period.

19. The computer-implemented method of claim 18, wherein:
   (a) a neural network is utilized to perform the polarity analysis; and
   (b) the neural network comprises a convolutional neural network having at least three layers.

20. The computer-implemented method of claim 18 comprising the further operations of executing a subject analysis that (i) processes the user content data for each of the one or more hosted content data packets labeled with at least one of the sequencing identifiers, and (ii) generates at least one subject identifier for each of the one or more sequencing identifiers.

* * * * *

UNITED STATES PATENT AND TRADEMARK OFFICE
CERTIFICATE OF CORRECTION

PATENT NO. : 11,973,832 B2  
APPLICATION NO. : 17/807470  
DATED : April 30, 2024  
INVENTOR(S) : Tariq Sulaiman Mansaray Page 1 of 1

It is certified that error appears in the above-identified patent and that said Letters Patent is hereby corrected as shown below:

In the Claims

Claim 17, Column 31, Line 25, "fans within at least one of the time period ranges; and" SHOULD BE "falls within at least one of the time period ranges; and"

Signed and Sealed this  
Eighth Day of October, 2024

Katherine Kelly Vidal  
*Director of the United States Patent and Trademark Office*